United States Patent
Takahashi

(10) Patent No.: US 7,457,482 B2
(45) Date of Patent: Nov. 25, 2008

(54) IMAGE PROCESSING APPARATUS, IMAGE PROCESSING METHOD, PROGRAM, AND STORAGE MEDIUM

(75) Inventor: Naoto Takahashi, Tochigi-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 11/015,002

(22) Filed: Dec. 20, 2004

(65) Prior Publication Data

US 2005/0141780 A1    Jun. 30, 2005

(30) Foreign Application Priority Data

Dec. 26, 2003    (JP) .............................. 2003-434547

(51) Int. Cl.
G06K 9/32    (2006.01)
G06K 9/46    (2006.01)

(52) U.S. Cl. ..................................... 382/298

(58) Field of Classification Search ......... 382/232–253, 382/128–131, 274–275, 298–300, 254; 358/3.23–3.24, 358/3.26–3.27, 3.02, 3.06, 1.9, 445–447; 386/46

See application file for complete search history.

(56) References Cited

U.S. PATENT DOCUMENTS

| | | | |
|---|---|---|---|
| 5,321,522 A * | 6/1994 | Eschbach ..................... | 382/239 |
| 6,269,217 B1 * | 7/2001 | Rodriguez .................... | 386/46 |
| 7,076,111 B2 * | 7/2006 | Shinbata ...................... | 382/254 |
| 2002/0159623 A1 | 10/2002 | Shinbata ...................... | 382/128 |
| 2003/0161549 A1 | 8/2003 | Lei et al. ..................... | 382/274 |
| 2003/0169912 A1 | 9/2003 | Shinbata ...................... | 382/131 |

FOREIGN PATENT DOCUMENTS

| | | |
|---|---|---|
| EP | 1 292 118 A2 | 3/2003 |
| JP | 2000-232583 | 8/2000 |
| JP | 2001/094828 | 4/2001 |
| WO | WO 01/69532 A1 | 9/2001 |

* cited by examiner

*Primary Examiner*—Sherali Ishrat
(74) *Attorney, Agent, or Firm*—Fitzpatrick, Cella, Harper & Scinto

(57) ABSTRACT

An image processing apparatus decomposes an image into frequency components of at least two frequency bands, and generates a basic conversion table used to change values of the frequency components. The image processing apparatus sets an expansion/contraction ratio of the basic conversion table on the basis of a pixel value range which is determined on the basis of the image. The basic conversion table is changed based on the set expansion/contraction ratio.

10 Claims, 8 Drawing Sheets

FIG. 5A
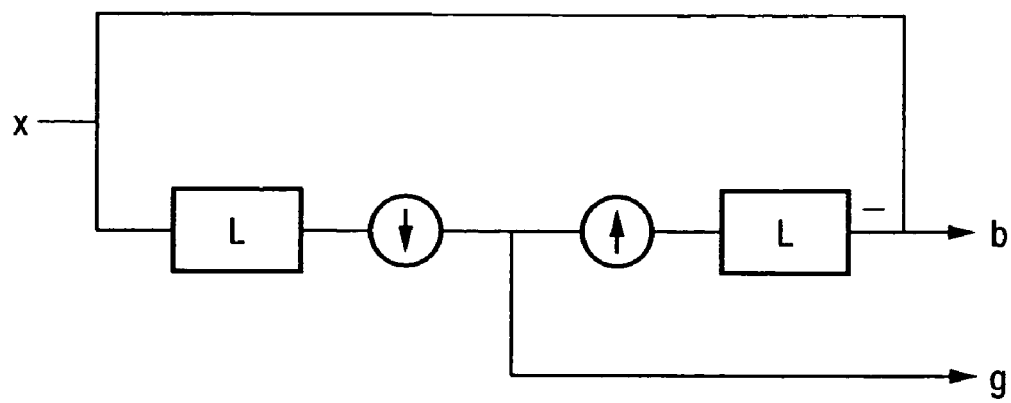
FIG. 5B
| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |
FIG. 5C
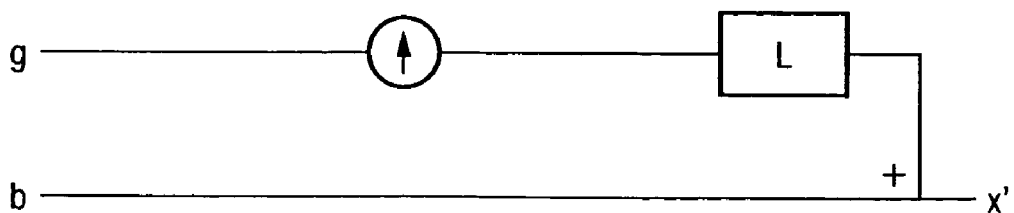

IMAGE PROCESSING APPARATUS, IMAGE PROCESSING METHOD, PROGRAM, AND STORAGE MEDIUM

FIELD OF THE INVENTION

The present invention relates to an image processing apparatus, image processing method, program, and readable medium, which execute a multi-frequency process and, more particularly, to a conversion table of high-frequency components.

BACKGROUND OF THE INVENTION

Along with the recent advance of digital technologies, a radiographic image or the like is converted into a digital image signal, which undergoes an image process such as a frequency process and the like, and the processed digital image is displayed on a CRT or the like or is printed on a film by a printer. Such frequency process is applied by decomposing an image to be processed into image components of a plurality of frequency bands, and increasing/decreasing the decomposed component values using a conversion table.

The digital image signal that has undergone the frequency process often undergoes a halftone process so as to optimally fall within the dynamic ranges of output media such as a CRT, film, and the like. For example, such process is done by adjusting the conversion table (also called a halftone conversion curve) so that the pixel value range of an object in an image falls within the dynamic range of an output medium. According to this method, since the entire object image is processed to fall within the dynamic range given to an output medium, the dynamic range of the output medium can be fully utilized, and an output image which allows easy diagnosis can be obtained. Also, since objects having different pixel value ranges are adjusted to fall within the dynamic range of an output medium, an output image having an equivalent density distribution can be obtained.

However, as the aforementioned halftone process changes the conversion table depending on the pixel value range of an object, the contrast of an image changes before and after the halftone process. More specifically, when the pixel value range of an object is narrow, since the pixel value range of an image after the halftone process is broadened, the contrast becomes high. When the pixel value range of an object is broad, since the pixel value range of an image after the halftone process is narrowed, the contrast becomes short.

SUMMARY OF THE INVENTION

The present invention has been made to solve the aforementioned problems, and has as its object to provide an image processing apparatus, image processing method, program, and storage medium, which do not suffer any image processing effect variations even before and after the halftone process, and can obtain a stable image processing effect.

In order to achieve the above object, an image processing apparatus according to the present invention comprises, e.g., the following arrangement. That is, there is provided an image processing apparatus comprising:

a decomposition unit configured to decompose an image into frequency components of at least two frequency bands;

a basic LUT generation unit configured to generate a basic conversion table used to change values of the frequency components;

an expansion/contraction ratio setting unit configured to set an expansion/contraction ratio of the basic conversion table on the basis of a pixel value range which is determined on the basis of the image; and a LUT correction unit configured to change the basic conversion table based on the set expansion/contraction ratio.

In order to achieve the above object, an image processing method according to an aspect of the present invention, comprises:

a decomposition step of decomposing an image into frequency components of at least two frequency bands;

a basic LUT generation step of generating a basic conversion table used to change values of the frequency components;

an expansion/contraction ratio setting step of setting an expansion/contraction ratio of the basic conversion table on the basis of a pixel value range which is determined on the basis of the image; and an LUT correction step of changing the basic conversion table based on the set expansion/contraction ratio.

In order to achieve the above object, according to an aspect of the present invention, there is provided a program for making a computer execute an image processing method, the program making the computer execute:

a decomposition step of decomposing an image into frequency components of at least two frequency bands;

a basic LUT generation step of generating a basic conversion table used to change values of the frequency components;

an expansion/contraction ratio setting step of setting an expansion/contraction ratio of the basic conversion table on the basis of a pixel value range which is determined on the basis of the image; and an LUT correction step of changing the basic conversion table based on the set expansion/contraction ratio.

In order to achieve the above object, according to an aspect of the present invention, there is provided a computer-readable storage medium recording a program for making a computer execute an image processing method, the program making the computer execute:

a decomposition step of decomposing an image into frequency components of at least two frequency bands;

a basic LUT generation step of generating a basic conversion table used to change values of the frequency components;

an expansion/contraction ratio setting step of setting an expansion/contraction ratio of the basic conversion table on the basis of a pixel value range which is determined on the basis of the image; and an LUT correction step of changing the basic conversion table based on the set expansion/contraction ratio.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5C are views for explaining decomposition and reconstruction of a Laplacian pyramid;

DETAILED DESCRIPTION OF THE PREFERRED EMBODIMENTS

Preferred embodiments of the present invention will now be described in detail in accordance with the accompanying drawings.

First Embodiment

Figure 1:
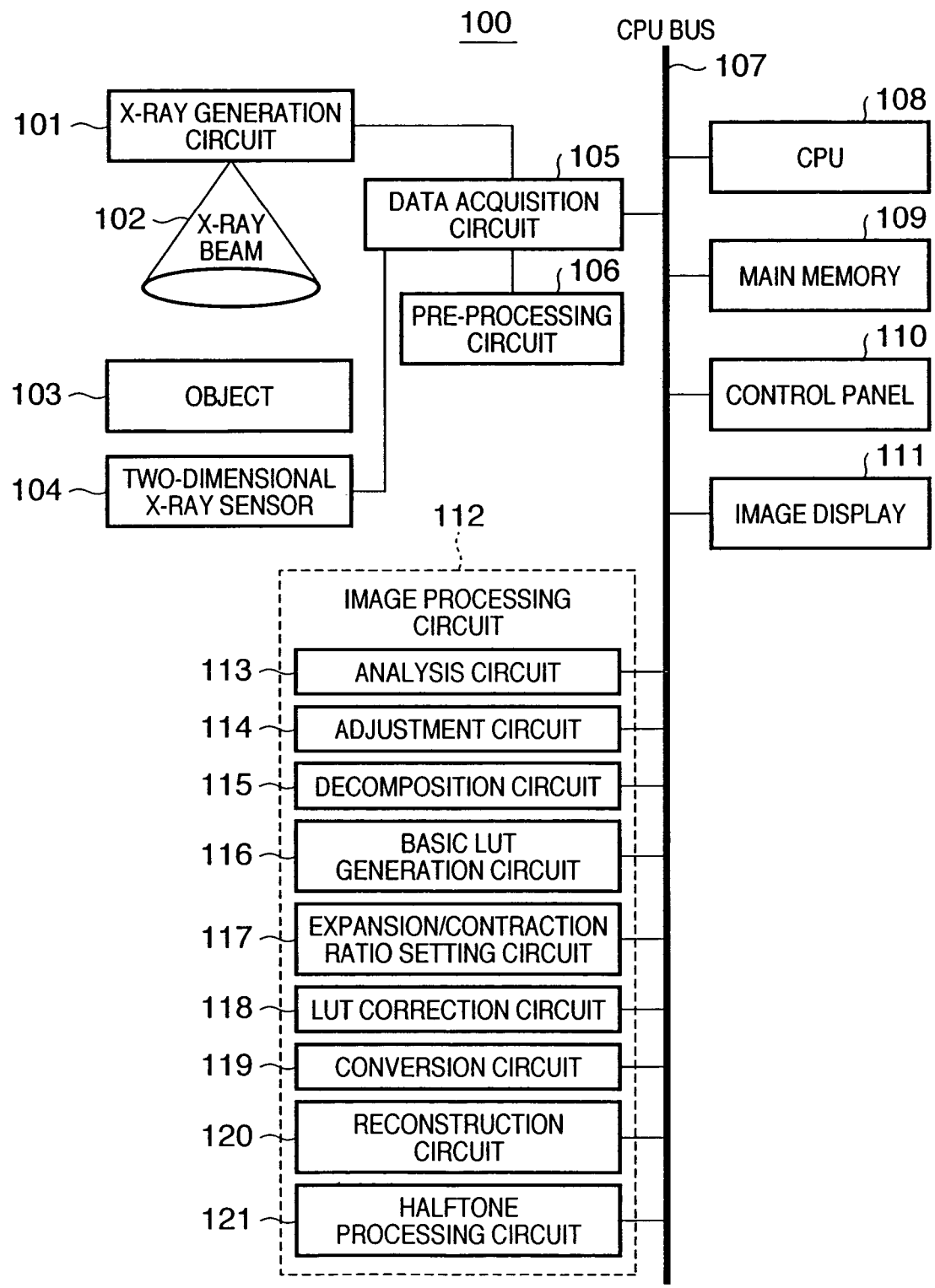
FIG. 1 is a block diagram of an image processing apparatus according to the first embodiment of the present invention.

FIG. 1 is a block diagram showing the arrangement of an X-ray imaging apparatus 100 of this embodiment. As shown in FIG. 1, the X-ray imaging apparatus 100 has a function of performing an image process required upon outputting a radiographed image onto a film or monitor. The X-ray imaging apparatus 100 has a data acquisition circuit 105, pre-processing circuit 106, CPU 108, main memory 109, control panel 110, image display 111, and image processing circuit 112, which are connected via a CPU bus 107 to exchange data with each other.

In the X-ray imaging apparatus 100, the data acquisition circuit 105 and pre-processing circuit 106 are connected to each other. A two-dimensional (2D) X-ray sensor 104 and X-ray generation circuit 101 are connected to the data acquisition circuit 105.

In the aforementioned X-ray imaging apparatus 100, the main memory 109 stores various data, programs, and the like required to execute the processes by the CPU 108, and includes a work memory for the CPU 108.

The CPU 108 performs operation control and the like of the overall apparatus using the main memory 109 in accordance with operations from the control panel 110. As a result, the CPU 108 operates as follows.

When the user inputs an imaging instruction via the control panel 110, this imaging instruction is supplied from the CPU 108 to the data acquisition circuit 105. Upon reception of the imaging instruction, the CPU 108 controls the X-ray generation circuit 101 and 2D X-ray sensor 104 to execute X-ray imaging.

In X-ray imaging, the X-ray generation circuit 101 irradiates an object 103 with an X-ray beam 102. The X-ray beam 102 generated by the X-ray generation circuit 101 is transmitted through the object 103 while attenuating, and reaches the 2D X-ray sensor 104. Then, the 2D X-ray sensor 104 outputs an X-ray image signal. In this embodiment, assume that the object 103 is a human body. That is, the X-ray image output from the 2D X-ray sensor 104 is a human body image.

The data acquisition circuit 105 converts the X-ray image signal output from the 2D X-ray sensor 104 into a predetermined digital signal, and supplies it as X-ray image data to the pre-processing circuit 106. The pre-processing circuit 106 applies pre-processes such as an offset correction process, gain correction process, and the like to the signal (X-ray image data) from the data acquisition circuit 105. The X-ray image data that has undergone the pre-processes by the pre-processing circuit 106 is transferred to the main memory 109 and image processing circuit 112 via the CPU bus 107 under the control of the CPU 108.

Reference numeral 112 denotes a block diagram showing the arrangement of the image processing circuit. In the image processing circuit 112, reference numeral 113 denotes an analysis circuit for analyzing the pixel value range of an object on the basis of an input image; 114, an adjustment circuit for adjusting the pixel value range of the image on the basis of the pixel value range analyzed by the analysis circuit 113; 115, a decomposition circuit for frequency-decomposing the image adjusted by the adjustment circuit 114; 116, a basic LUT generation circuit for generating a conversion table as a basis of changing respective frequency component values decomposed by the decomposition circuit 115; 117, an expansion/contraction ratio setting circuit for setting the expansion/contraction ratio of the conversion table on the basis of the pixel value range analyzed by the analysis circuit 113; 118, an LUT correction circuit for expanding/contracting the conversion table generated by the basic LUT generation circuit 116 on the basis of the expansion/contraction ratio set by the expansion/contraction ratio setting circuit 117; 119, a conversion circuit for converting respective frequency component values decomposed by the decomposition circuit using the conversion table corrected by the LUT correction circuit 118; 120, a reconstruction circuit for reconstructing the image on the basis of the frequency component values converted by the conversion circuit 119; and 121, a halftone processing circuit for optimizing the gray balance of the image reconstructed by the reconstruction circuit 119.

Figure 2:
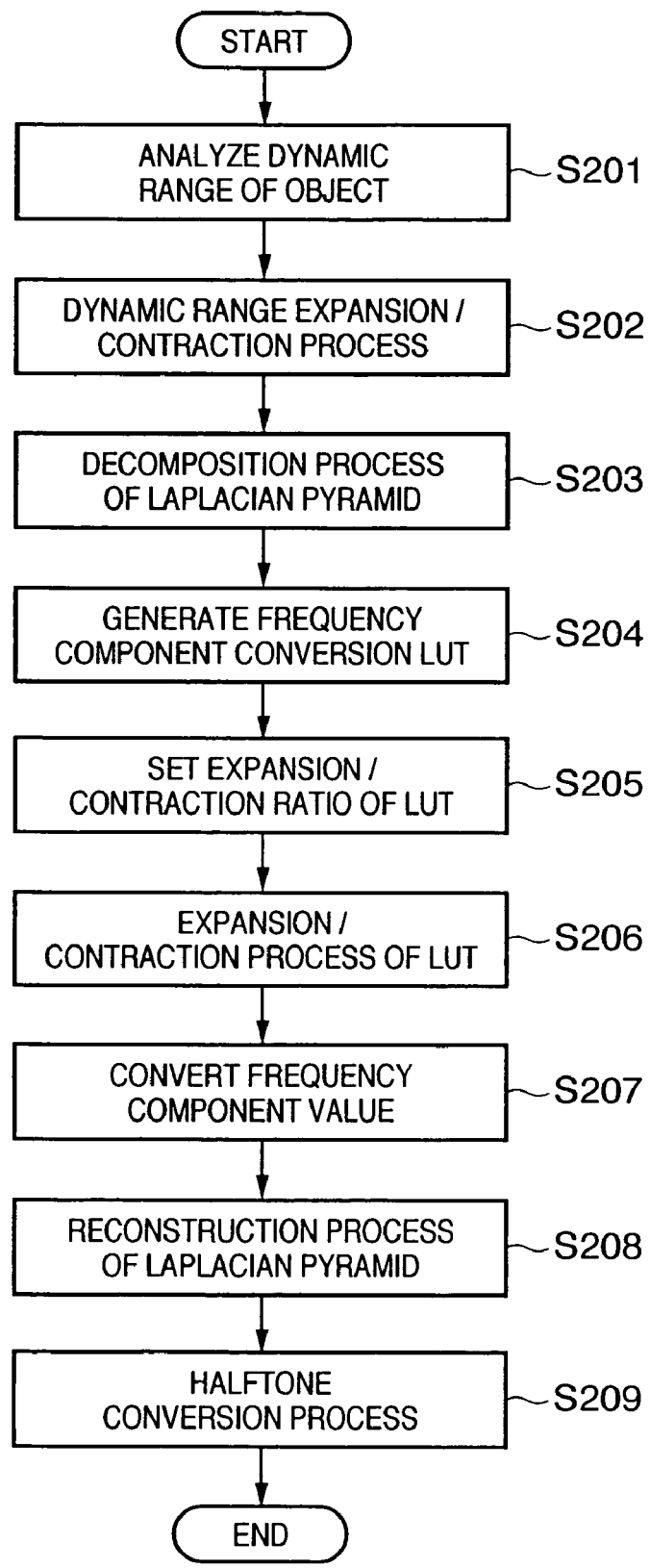
FIG. 2 is a flowchart showing the processing sequence of the image processing apparatus according to the first embodiment of the present invention.

The operation of the X-ray imaging apparatus of this embodiment with the aforementioned arrangement will be described in detail below. FIG. 2 is a flowchart showing the flow of the processes of the X-ray imaging apparatus 100 according to this embodiment.

An original image obtained by the pre-processing circuit 106 is transferred to the image processing circuit 112 via the CPU bus 107. In step S201, the analysis circuit 113 of the image processing circuit 112 analyzes the pixel value range of the original image. In this case, the pixel value range of a region to be displayed on an output medium is calculated. In this embodiment, the pixel value range of an object in an input image is calculated. The calculation method is not particularly limited. For example, a value 90% of the maximum pixel value is calculated as Th1 from the pixel values of the entire input image, and an image f1(x, y) after a non-object region and a body region that contacts the non-object region within a given space range are deleted from an input image f(x, y) by:

$$f1(x, y) = f(x, y) \times \prod_{x1=-d1}^{x1=d1} \prod_{y1=-d2}^{y1=d2} \mathrm{sgn}(x+x1, y+y1) \quad (1)$$

for sgn(x, y)=0 when f(x, y)≧Th1 sgn (x, y)=0 otherwise where d1 and d2 are constants used to determine the given space range upon deleting the body region that contacts the non-object region from the input image f(x, y) and are determined on the basis of the size of the input image f(x, y) or the like.

From the image f1(x, y) from which the non-object region has been removed, the pixel value range of the object is calculated from maximum and minimum values except for zero pixel value. This method has already been proposed by the present applicant (Japanese Patent Laid-Open No. 2001-094828).

Figure 3:
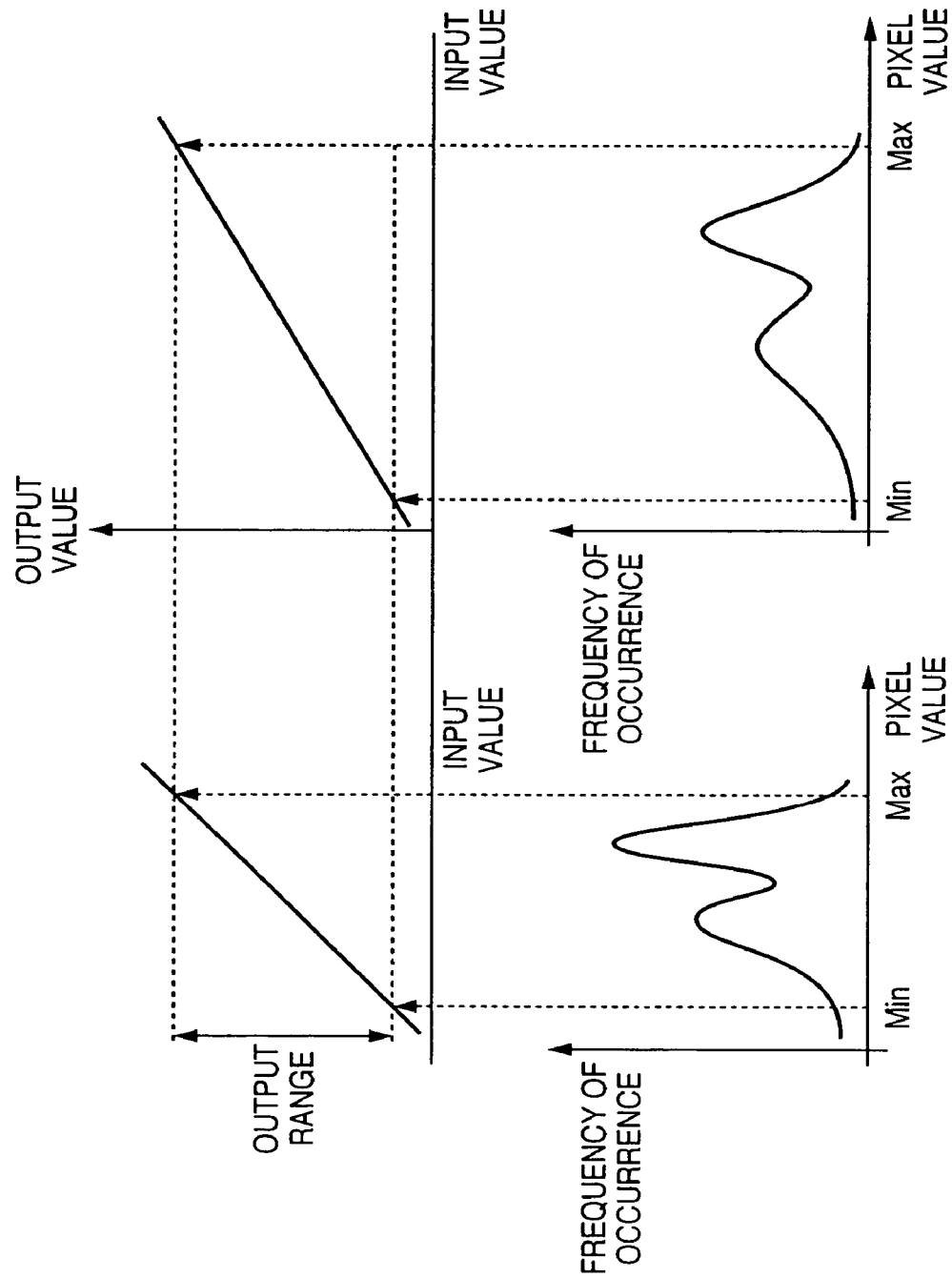
FIG. 3 shows an example of a pixel value range expansion/contraction process.

In step S202, the adjustment circuit 114 executes the image expansion/contraction process on the basis of the pixel value range of the object calculated by the analysis circuit 113. In this embodiment, linear conversion is applied so that maximum and minimum values of different objects are converted into equivalent values, as shown in FIG. 3. Referring to FIG. 3, Min indicates the minimum value of an object, and Max indicates the maximum value of the object. In the graphs of the lower portion in FIG. 3, the abscissa plots the pixel values, and the ordinate plots the frequency of occurrence. The above graphs correspond to halftone conversion tables (also called halftone conversion curves) used in the adjustment circuit 114. In these graphs, the abscissa plots the input value, and the ordinate plots the output value. In FIG. 3, an output range means the dynamic range of an output medium, which has, as its unit, density for a film or luminance for a monitor.

Figure 4:
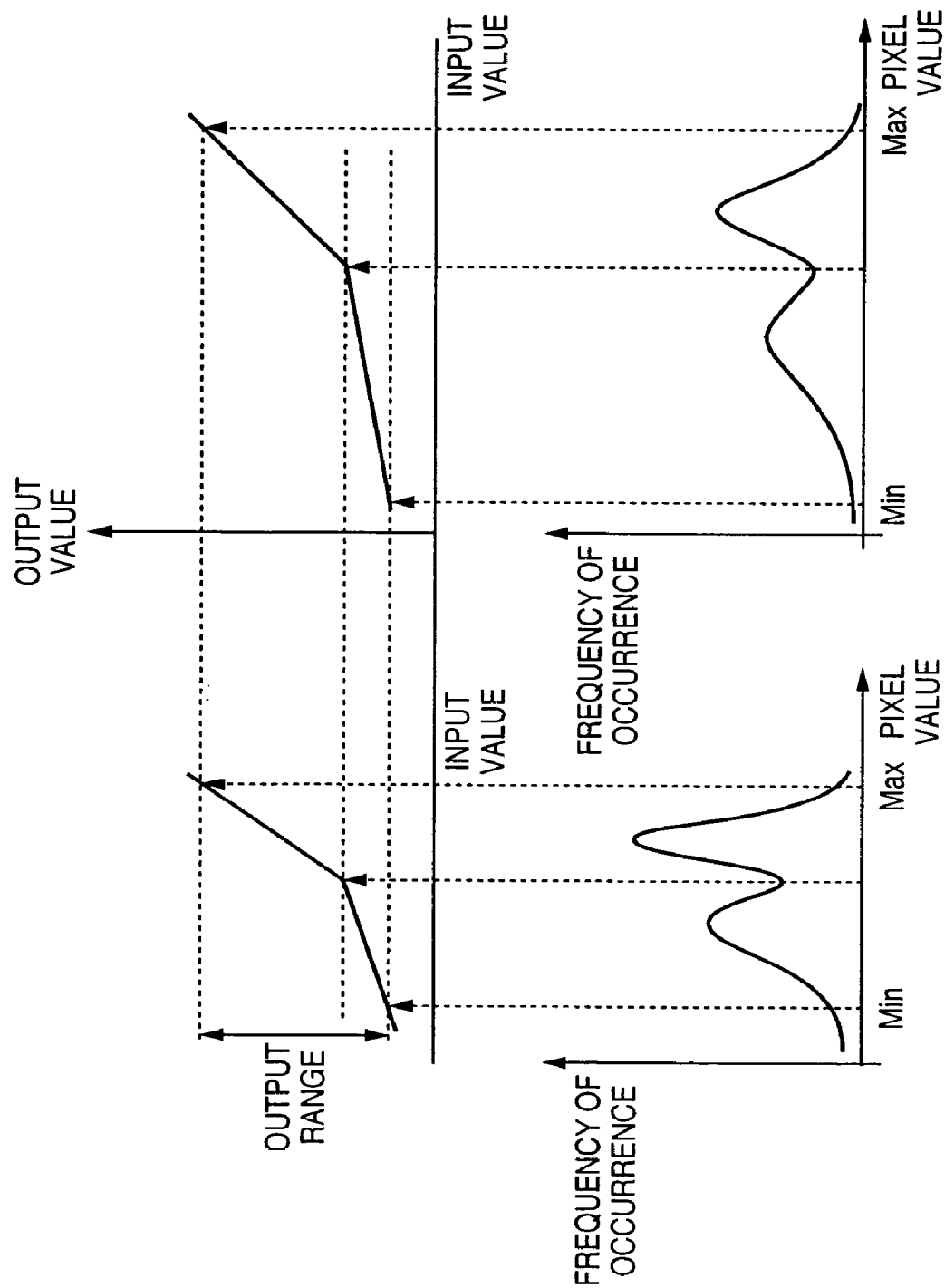
FIG. 4 shows an example of a pixel value range expansion/contraction process.

Also, as shown in FIG. 4, the slope of each halftone conversion table may be changed for respective pixel value regions in an object.

In step S203, the decomposition circuit 115 decomposes the image which has undergone the pixel value range adjustment in the adjustment circuit 114 into components of a plurality of frequency bands. In this embodiment, frequency decomposition is made using a Laplacian pyramid algorithm.

Decomposition of a Laplacian pyramid will be explained below with reference to FIGS. 5A and 5B. In FIG. 5A, g and b respectively represent a low-resolution approximate image and high-frequency component of an image after decomposition of 1 level. The low-resolution approximate image g is obtained by filtering by a low-pass filter and downsampling an image signal x. The high-frequency component b is obtained by calculating the difference between the image signal x and an image which is obtained by upsampling the low-resolution approximate image g and filtering the upsampled image by a low-pass filter. Each low-pass filter uses a filter shown in, e.g., FIG. 5B. The Laplacian pyramid obtains image components of respective frequency bands by repeating this process to the low-resolution approximate image g. Since details of such process are known to those who are skilled in the art, a description thereof will be omitted. By changing image components and applying a reconstruction process (to be described later), an image processing effect can be obtained. Processing effects such as a sharpening process, dynamic range adjustment process, noise reduction process, and the like can be obtained by changing the frequency components. Components used to change the image processing effects will be referred to as frequency components hereinafter.

Note that frequency component decomposition of an image is done by the Laplacian pyramid algorithm in this embodiment. However, the present invention is not limited to this, and other methods such as discrete wavelet transformation and the like may be used. Furthermore, the moving average method may be used to calculate the high-frequency and low-frequency components. That is, this embodiment has been explained using the Laplacian pyramid algorithm, but its technical idea can be applied to cases using other frequency component decomposition processes.

In frequency decomposition using wavelet transformation, the frequency components are often called frequency coefficients. However, the frequency coefficients will be called frequency components when they are used to change the image processing effect.

On the other hand, in frequency decomposition using moving average, the frequency components are often called image components or pixel values. However, in frequency decomposition using moving average, the image components or pixel values will again be called frequency components when they are used to change the image processing effect.

As described above, the frequency process is applied by decomposing an image into frequency components, and changing the component values of respective frequency ranges using a conversion table. The frequency processing method will be described in detail below.

Figure 6:
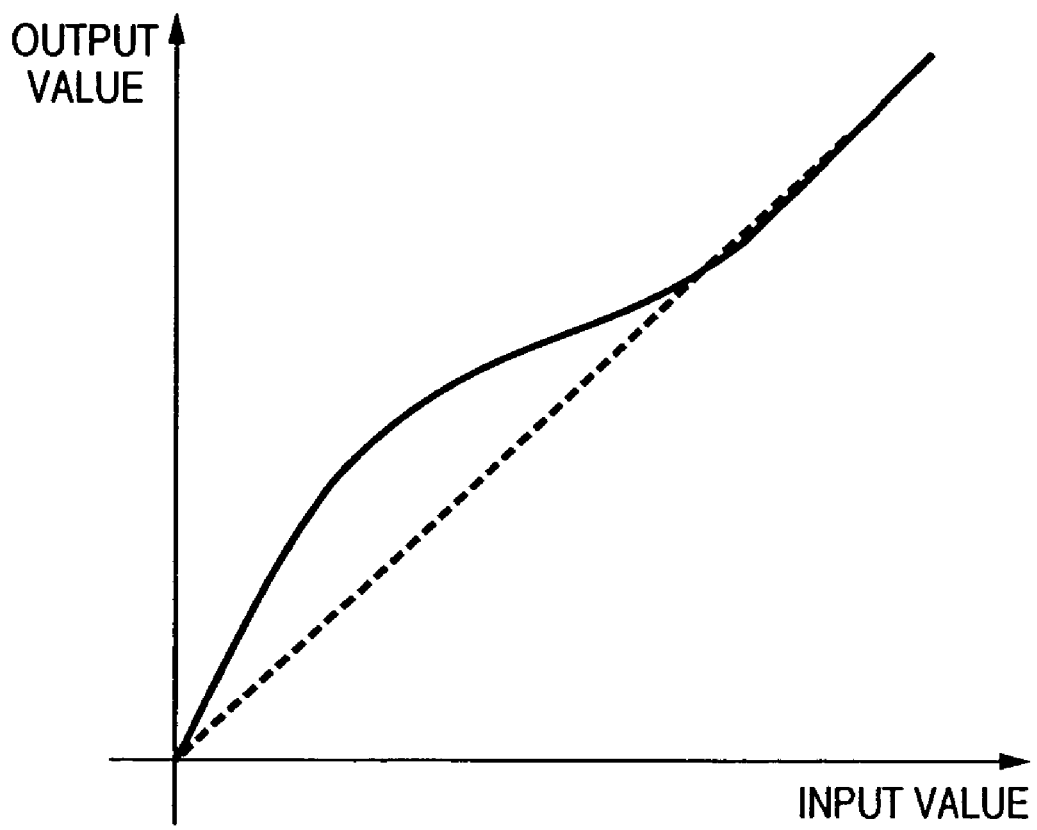
FIG. 6 shows an example of a basic conversion table.
Figure 7:
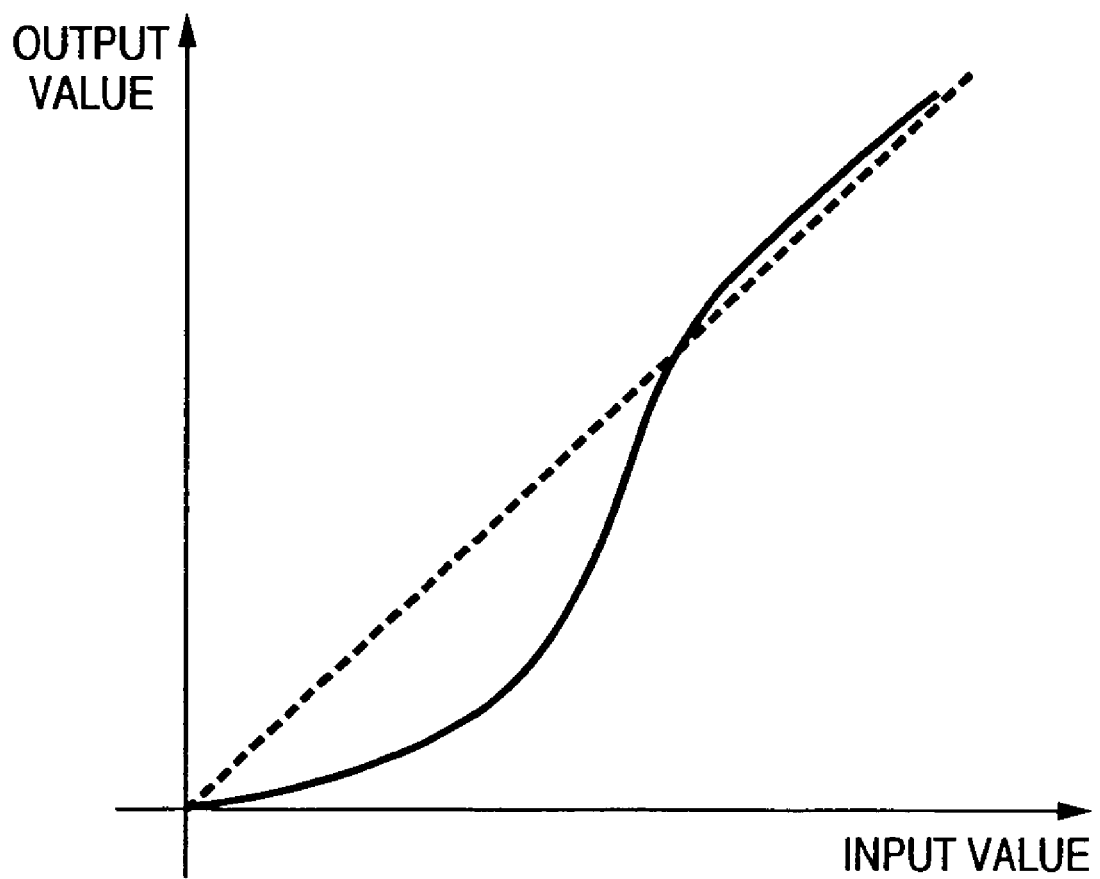
FIG. 7 shows an example of a basic conversion table.

In step S204, the basic LUT generation circuit 116 generates a basic conversion table (the conversion table is often called a conversion curve but it will be referred to as "conversion table" hereinafter) used to change the component values of required ones of a plurality of frequency bands decomposed by the decomposition circuit 115. Note that the basic conversion table is a conversion table used to convert the frequency component values. Since the basic conversion table to be generated is determined based on a target image process, it is not particularly limited. For example, a conversion table that nonlinearly increases an input value, as shown in FIG. 6, may be used, or a basic conversion table that nonlinearly decreases an input value, as shown in FIG. 7, may be used. Note that the basic conversion table is originally an odd function since actual input values assume positive and negative values. However, each of FIGS. 6 and 7 shows only the first quadrant. In general, when an input value is increased, a sharpening effect can be obtained; when an input value is decreased, a smoothing effect can be obtained. When the frequency process is to be skipped, a linear conversion table may be used. Note that the number of basic conversion tables to be generated is not limited to one, but different basic conversion tables may be generated for respective target frequency bands.

In step S205, the expansion/contraction ratio setting circuit 117 calculates the expansion/contraction ratio of the basic conversion table on the basis of the pixel value range adjusted by the adjustment circuit 114. In this embodiment, the same value as the expansion/contraction ratio of the image expanded/contracted by the adjustment circuit 14 is set as the expansion/contraction ratio. More specifically, when the dynamic range of an image is compressed to ×0.5 by the adjustment circuit 114, "0.5" is set as the expansion/contraction ratio. On the other hand, when the pixel value range of an image is expanded to ×1.5, "1.5" is set as the expansion/contraction ratio. When different expansion/contraction ratios are set for respective object regions, as shown in FIG. 4, the expansion/contraction ratios corresponding to respective regions are set.

Figure 8:
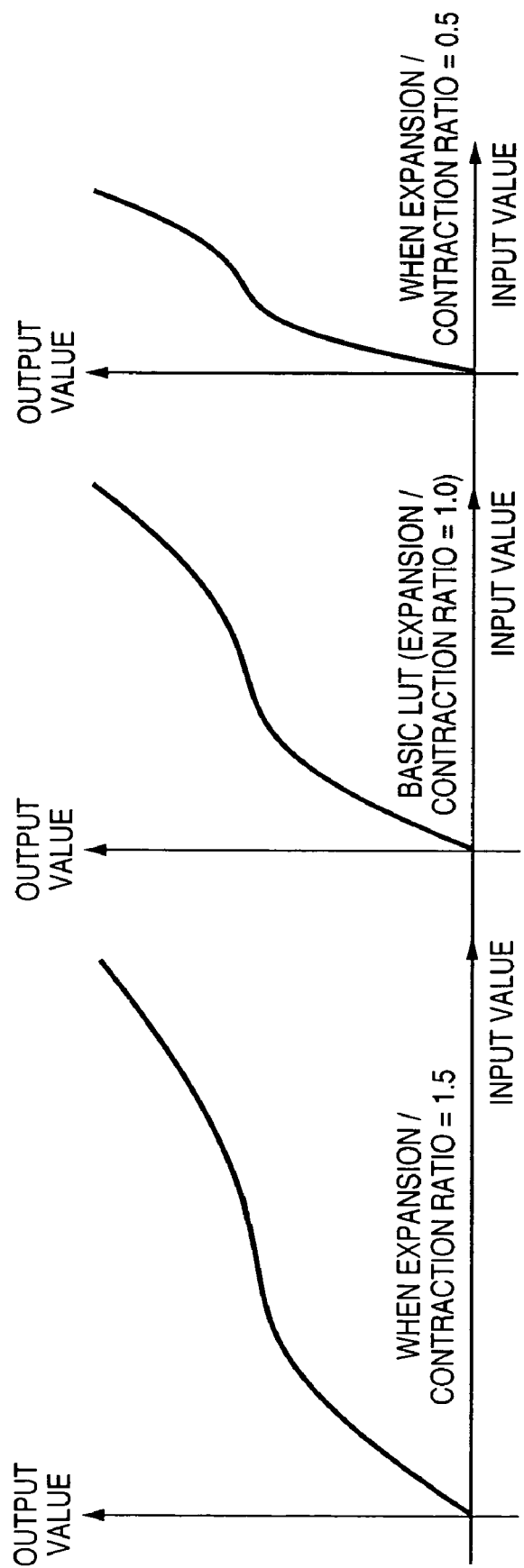
FIG. 8 is a view for explaining an expansion/contraction process of the basic conversion table.

In step S206, the LUT correction circuit 118 expands/contracts the basic conversion table generated by the basic LUT generation circuit 116 in accordance with the expansion/contraction ratio set by the expansion/contraction ratio setting circuit 117. In this embodiment, the basic conversion table is expanded/contracted in the output axis direction (horizontal axis direction) in accordance with the expansion/contraction ratio. More specifically, as shown in FIG. 8, when the expansion/contraction ratio is 1.5, the scale of the input axis is multiplied by 1.5. On the other hand, when the expansion/contraction ratio is 0.5, the scale of the input axis is multiplied by 0.5. As a result, since the scale of the basic conversion table is similarly corrected in accordance with image expansion/contraction, the output value of the changed basic conversion table always falls within a given range. In this way, a constant image processing effect can always be obtained independently of image expansion/contraction.

In step S207, the conversion circuit 119 applies the frequency process by converting the component values of the frequency bands using the conversion table corrected by the LUT correction circuit 118. When different expansion/contraction ratios are set for respective object regions, as shown in FIG. 4, different conversion tables can be applied for respective frequency components corresponding to these regions.

As described above, the frequency process is applied. The basic conversion table used in the frequency process is corrected in accordance with the expansion/contraction ratio of an image. Therefore, even when the contrast varies by image expansion/contraction, the contrast of the frequency bands that have undergone the frequency process becomes always constant, thus obtaining a stable frequency effect. When only the contrast variation due to image expansion/contraction is to be corrected, a linear basic conversion table may be set to apply a conversion process to desired frequency bands.

In step S208, the reconstruction circuit 120 executes a reconstruction process of the Laplacian pyramid using the frequency components converted by the conversion circuit 119. FIG. 5C shows the arrangement of the reconstruction circuit 120. An image signal x' is output by adding the input high-frequency component b to an image obtained by upsampling the low-resolution approximate image g and filtering the upsampled image using a low-pass filter. By repeating this process for respective levels, an image can be reconstructed. Details of this process is known to those who are skilled in the art, and a description thereof will be omitted.

In step S209, the halftone processing circuit 121 executes an optimal halftone process using a conversion table according to an output medium. The conversion table is not particularly limited. For example, when an image is to be output onto an X-ray film, an S-curve equivalent to the characteristic curve of a film may be used. Note that the image which is to undergo the halftone process is obtained by correcting the pixel value range and contrast in advance. If such image is processed using a single conversion table, an output image having an equivalent density distribution and contrast can be obtained.

As described above, according to this embodiment, when the pixel value range of an image is adjusted and the converted image undergoes halftone conversion, the density of the entire image becomes stable independently of the pixel value range. Also, since the frequency component conversion table is expanded/contracted in accordance with the expansion/contraction ratio of the pixel value range of an image, the variations of contrast and frequency processing effects due to the influence of expansion/contraction of the pixel value range of an image can be suppressed.

In this embodiment, the image process is applied after an image is expanded/contracted by the adjustment circuit 14. However, an image may be expanded/contracted by the adjustment circuit 114 after the reconstruction process. In step S206, the LUT correction circuit 118 expands/contracts the basic conversion table generated by the basic LUT generation circuit 116 in accordance with the expansion/contraction ratio set by the expansion/contraction ratio setting circuit 117. The basic conversion table is expanded/contracted in the input axis direction (vertical direction) in accordance with the expansion/contraction ratio. As a result, a constant image processing effect can always be assured independently of image expansion/contraction.

By setting the expansion/contraction ratio and changing the basic conversion table, a flexible conversion process can be effectively done in accordance with the amplitude levels of frequency components.

By adjusting the pixel value range of an image, the density of the entire image effectively becomes stable. Furthermore, by expanding/contracting the basic conversion table in accordance with the expansion/contraction ratio of the pixel value range of an image, the variation of the image processing effect due to expansion/contraction of the pixel value range of an image can be suppressed.

By setting the expansion/contraction ratio and correcting the basic conversion table, a flexible conversion process can be effectively done in accordance with the amplitude levels of frequency components to be converted. Since the basic conversion table is corrected by expanding/contracting at least one of the input axis direction or output axis direction, correction can be efficiently done in case of a nonlinear conversion table.

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements novel functions of the present invention, and the storage medium which stores the program code constitutes the present invention.

As the storage medium for supplying the program code, for example, a ROM, floppy® disk, hard disk, optical disk, magneto-optical disk, CD-ROM, CD-R, magnetic tape, nonvolatile memory card, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When such program or storage medium which stores that program is applied to the present invention, the program is formed of program codes corresponding to, e.g., the flowchart shown in FIG. 2.

As described above, according to the present invention, an image processing apparatus, image processing method, program, and storage medium, which do not suffer any image processing effect variations even before and after the halftone process, and can obtain a stable image processing effect, can be provided.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-434547 filed on Dec. 26, 2003, which is hereby incorporated by reference herein.

What is claimed is:

1. An image processing apparatus comprising:
a decomposition unit configured to decompose an image into frequency components of at least two frequency bands;
a basic LUT generation unit configured to generate a basic conversion table used to change values of the frequency components;
an expansion/contraction ratio setting unit configured to set an expansion/contraction ratio of the basic conversion table on the basis of a pixel value range which is determined on the basis of the image; and
an LUT correction unit configured to change the basic conversion table based on the set expansion/contraction ratio.

2. The apparatus according to claim 1, further comprising:
an analysis unit configured to analyze a pixel value range of an object from the image,
wherein said expansion/contraction ratio setting unit sets the expansion/contraction ratio of the basic conversion table on the basis of the pixel value range analyzed by said analysis unit.

3. The apparatus according to claim 1, wherein said LUT correction unit expands/contracts the basic conversion table generated by said basic LUT generation unit on the basis of the expansion/contraction ratio set by said expansion/contraction ratio setting unit in at least one of an input axis direction and output axis direction.

4. The apparatus according to claim 1, further comprising:
a conversion unit configured to convert the frequency components of the frequency bands using the conversion table changed by said LUT correction unit.

5. The apparatus according to claim 4, further comprising:
a reconstruction unit configured to reconstruct image data using the frequency components of the frequency bands converted by said conversion unit.

6. The apparatus according to claim 1, further comprising:
an adjustment unit configured to adjust a pixel value range of an image,
wherein the image is an image after the pixel value range has been adjusted by said adjustment unit.

7. The apparatus according to claim 5, further comprising:
a second adjustment unit configured to adjust a pixel value range of the image reconstructed by said reconstruction unit.

8. The apparatus according to claim 1, wherein said decomposition unit uses a Laplacian pyramid algorithm.

9. An image processing method comprising:
a decomposition step of decomposing an image into frequency components of at least two frequency bands;
a basic LUT generation step of generating a basic conversion table used to change values of the frequency components;
an expansion/contraction ratio setting step of setting an expansion/contraction ratio of the basic conversion table on the basis of a pixel value range which is determined on the basis of the image; and
an LUT correction step of changing the basic conversion table based on the set expansion/contraction ratio.

10. A computer-readable storage medium recording a program for making a computer execute an image processing method, said program making the computer execute:
a decomposition step of decomposing an image into frequency components of at least two frequency bands;
a basic LUT generation step of generating a basic conversion table used to change values of the frequency components;
an expansion/contraction ratio setting step of setting an expansion/contraction ratio of the basic conversion table on the basis of a pixel value range which is determined on the basis of the image; and
an LUT correction step of changing the basic conversion table based on the set expansion/contraction ratio.

* * * * *